US009100262B2

(12) United States Patent
Nam et al.

(10) Patent No.: US 9,100,262 B2
(45) Date of Patent: Aug. 4, 2015

(54) APPARATUS AND METHOD FOR RECEIVING DATA IN COMMUNICATION SYSTEM

(71) Applicant: ELECTRONICS AND TELECOMMUNICATIONS RESEARCH INSTITUTE, Daejeon (KR)

(72) Inventors: Seung-Hyun Nam, Chungcheongnam-do (KR); Hee-Wook Kim, Daejeon (KR); Tae-Chul Hong, Seoul (KR); Kun-Seok Kang, Daegu (KR); Bon-Jun Ku, Daejeon (KR); Do-Seob Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 195 days.

(21) Appl. No.: 13/659,023

(22) Filed: Oct. 24, 2012

(65) Prior Publication Data
US 2014/0064411 A1 Mar. 6, 2014

(30) Foreign Application Priority Data
Aug. 30, 2012 (KR) .................. 10-2012-0095622

(51) Int. Cl.
*H03K 9/00* (2006.01)
*H04L 27/00* (2006.01)
*H04L 27/26* (2006.01)

(52) U.S. Cl.
CPC ........ *H04L 27/2679* (2013.01); *H04L 27/0014* (2013.01); *H04L 27/2657* (2013.01); *H04L 2027/0065* (2013.01); *H04L 2027/0089* (2013.01)

(58) Field of Classification Search
CPC ............. H04L 2027/0065; H04L 2027/0089; H04L 27/0014
USPC .................................. 375/260, 267, 316, 324
See application file for complete search history.

(56) References Cited

U.S. PATENT DOCUMENTS

| 5,809,087 A * | 9/1998 | Ashe et al. ................... 375/340 |
| 7,941,287 B2 * | 5/2011 | Tabatabaei ...................... 702/69 |
| 2009/0129514 A1 * | 5/2009 | Twitto ........................... 375/341 |

FOREIGN PATENT DOCUMENTS

| KR | 1020030089995 A | 11/2003 |
| KR | 1020100052919 A | 5/2010 |

OTHER PUBLICATIONS

Comparison of Various Periodograms for Sinusoid Detection and Frequency Estimation, IEEE Transactions on Aerospace and Electronic Systems, vol. 35, No. 3, Jul. 1999, pp. 945-952.*

(Continued)

*Primary Examiner* — Freshteh N Aghdam
(74) *Attorney, Agent, or Firm* — Ladas & Parry LLP (57) ABSTRACT

Disclosed are an apparatus and a method for normally receiving data by accurately estimating and compensating for a frequency offset for a wireless frequency channel through which data are transmitted in a communication system under wireless frequency environment. In the present invention, data transmitted through the wireless frequency channel are received, the frequency offset in the wireless frequency channel from the receive data is estimated based on an interpolation scheme using the periodogram, and the frequency offset is compensated to receive the data by frequency-synchronizing with the wireless frequency channel.

13 Claims, 5 Drawing Sheets

(56) References Cited

OTHER PUBLICATIONS

Yuchun et al., A Highly Accurate Iterative Interpolated Frequency Estimator, IEEE, 2008, pp. 1-5.*

Seunghyun Nam, et al; "An Improved Large Frequency Offset Estimator Using Interpolation of Expanded Periodgram", IEICE Trans. Commun., vol. E95-B, No. 9, pp. 3007-3010, Sep. 2010.

Barry Quinn; "Estimating Frequency by Interpolation Using Fourier Coefficients", IEEE Transactions on Signal Processing, vol. 42, No. 5, pp. 1264-1268, May 1994.

Guangliang Ren, et al; "An Efficient Frequency Offset Estimation Method With a Large Range for Wireless OFDM Systems", IEEE Transactions on Vehicular Technology, vol. 56, No. 4, Jul. 2007, pp. 1892-1895.

* cited by examiner

APPARATUS AND METHOD FOR RECEIVING DATA IN COMMUNICATION SYSTEM

CROSS-REFERENCE TO RELATED APPLICATIONS

The present application claims priority of Korean Patent Application No. 10-2012-0095622, filed on Aug. 30, 2012, which is incorporated herein by reference in its entirety.

BACKGROUND OF THE INVENTION

1. Field of the Invention

Exemplary embodiments of the present invention relate to a communication system, and more particularly, to an apparatus and a method for normally receiving data by accurately estimating and compensating for a frequency offset for a wireless frequency channel through which data are transmitted in a communication system under wireless frequency environment.

2. Description of Related Art

Research into plans for providing services of various qualities of service (QoS) having a high-speed transmission speed to users in a current communication system and research into schemes for stably transmitting large-capacity data through limited resources at high speed have been actively conducted. In particular, research into data transmission through a wireless frequency channel has been progressed in a communication system. Recently, schemes for transmitting and receiving large-capacity data using effectively using the wireless frequency channel have been proposed.

Meanwhile, data are transmitted and received using a frequency division multiple access scheme so as to transmit and receive large-capacity data through the wireless frequency channel in the communication system. In this case, the frequency offset for the wireless frequency channel is generated. The generated frequency offset degrades performance of data transmission and reception of the communication system and therefore, the accurate estimation and compensation of the frequency offset are required so as to improve the performance of data transmission and reception. In order to estimate and compensate for the frequency offset, various schemes have been proposed. As an example, the schemes for estimating and compensating for the frequency offset using a cyclic prefix (CP) (hereinafter, referred to as 'CP'), preamble, and the like, have been proposed.

However, the schemes for estimating and compensating for the currently proposed frequency offset, in particular, the schemes for estimating and compensating for the frequency offset using the foregoing CP or preamble increase a length of a training symbol corresponding to the CP or the preamble on a time base so as to more accurately estimate the frequency offset. As the length of the training symbol is increased, the data capacity that is transmitted and received through the real wireless frequency channel is reduced. Further, in order to transmit and receive the large-capacity data through the wireless frequency channel, the length of the foregoing training symbol is reduced. As the length of the training symbol is reduced, there is a limitation in accurately estimating the frequency offset.

Therefore, when transmitting and receiving the large-capacity data through the wireless frequency channel in the communication system, a need exists for schemes for improving the performance of the data transmission and reception of the communication system and normally receiving the large-capacity data through the wireless frequency channel, by accurately estimating the frequency offset and then, compensating for the estimated frequency offset.

SUMMARY OF THE INVENTION

An embodiment of the present invention is directed to an apparatus and a method for receiving data in a communication system.

Another embodiment of the present invention is directed to an apparatus and a method for normally receiving large-capacity data through a wireless frequency channel in a communication system.

Still another embodiment of the present invention is directed to an apparatus and a method for receiving data capable of improving performance of data transmission and reception of a communication system, by accurately estimating and compensating for a frequency offset generated at the time of transmitting and receiving data through a wireless frequency channel in a communication system so as to normally receive large-capacity data.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

An apparatus for receiving data in a communication system includes: a receiving unit configured to receive data transmitted through a wireless frequency channel; an estimating unit configured to estimate a frequency offset in the wireless frequency channel from the received data, based on an interpolation scheme a periodogram; and a compensating unit configured to compensate for the frequency offset so as to receive the data by frequency-synchronizing with the wireless frequency channel.

A method for receiving data in a communication system includes: receiving data transmitted through a wireless frequency channel; estimating a frequency offset in the wireless frequency channel from the received data, based on an interpolation scheme a periodogram; and compensating for the frequency offset so as to receive the data by frequency-synchronizing with the wireless frequency channel.

DESCRIPTION OF SPECIFIC EMBODIMENTS

Hereinafter, embodiments of the present invention will be described in detail with reference to the accompanying drawings. It is to be noted that only components required to understand an operation in accordance with the present invention is described below and the description of other components will be omitted not to unnecessarily obscure the subject matters of the present invention.

An embodiment of the present invention proposes an apparatus and a method for receiving data through a wireless frequency channel in a communication system. Herein, the embodiment of the present invention proposes an apparatus and a method for normally receiving data transmitted through a wireless frequency channel, by accurately estimating a frequency offset generated at the time of transmitting and receiving data through the wireless frequency channel in the communication system and then, compensating for the estimated frequency offset.

Further, in accordance with the embodiment of the present invention, the apparatus for receiving data in the communication system accurately estimates the frequency offset generated at the time of transmitting and receiving data through the wireless frequency channel based on an interpolation scheme using a periodogram and then, compensates for the estimated frequency offset, thereby normally receiving large-capacity data transmitted through the wireless frequency channel from an apparatus for transmitting data. Herein, the embodiment of the present invention accurately estimates the frequency offset effectively based on the interpolation scheme using the periodogram even when a generation range of the frequency offset is wide, in particular, estimates the frequency offset using a smaller number of reference signals by using the periodogram.

Further, in the embodiment of the present invention, the apparatus for receiving data accurately estimates the frequency offset based on the interpolation scheme using the periodogram. In this case, the apparatus for receiving data interpolates the frequency offset with coefficients of the frequency offset in the periodogram so as to more accurately estimate the frequency offset. Herein, the embodiment of the present invention estimate an integer multiple frequency offset using at least one periodogram having amplitude values and compares the amplitude values of the estimated integer multiple frequency offset index to interpolate the coefficients of the frequency offset corresponding to the amplitude values of the index having a large value in the periodogram, thereby more accurately estimating the frequency offset. Herein, the apparatus for receiving data in the communication system in accordance with the embodiment of the present invention will be described in detail with reference to FIG. 1.

Figure 1:
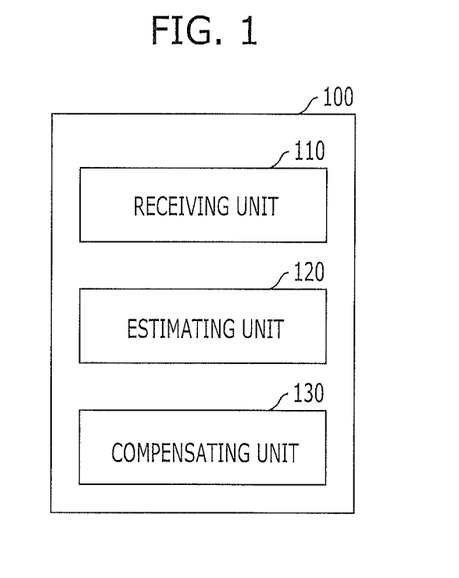
FIG. 1 is a diagram schematically illustrating a structure of an apparatus for receiving data in a communication system in accordance with an embodiment of the present invention.

FIG. 1 is a diagram schematically illustrating a structure of the apparatus for receiving data in the communication system in accordance with the embodiment of the present invention.

Referring to FIG. 1, an apparatus 100 for receiving data is configured to include a receiving unit 110 configured to receive large-capacity data transmitted by an apparatus for transmitting data through a wireless frequency channel, an estimating unit 120 configured to estimate a frequency offset generated at the time of transmitting and receiving data through the wireless frequency channel, and a compensating unit 130 configured to compensate for the estimated frequency offset so as to normally receive the data transmitted through the wireless frequency channel from the apparatus for transmitting data.

The estimating unit 120 estimates the frequency offset generated at the time of transmitting and receiving the data transmitted through the wireless frequency channel from the apparatus for transmitting data, in particular, accurately estimates the frequency offset based on an interpolation scheme using the periodogram from data, that is, signals, that are received through the receiving unit 110. Further, the compensating unit 130 compensates for the estimated frequency offset to be frequency-synchronized with the wireless frequency channel through which the data are transmitted, such that the receiving unit 110 normally receives the data transmitted through the wireless frequency channel.

Herein, the interpolation scheme using the periodogram of the foregoing estimating unit 120 will be described in more detail with reference to the following Equations and FIGS. 3 to 9. Herein, an operation of the apparatus for receiving data in the communication system in accordance with the embodiment of the present invention to receive the large-capacity data transmitted through the wireless frequency channel will be described in more detail with reference to FIG. 2.

Figure 2:
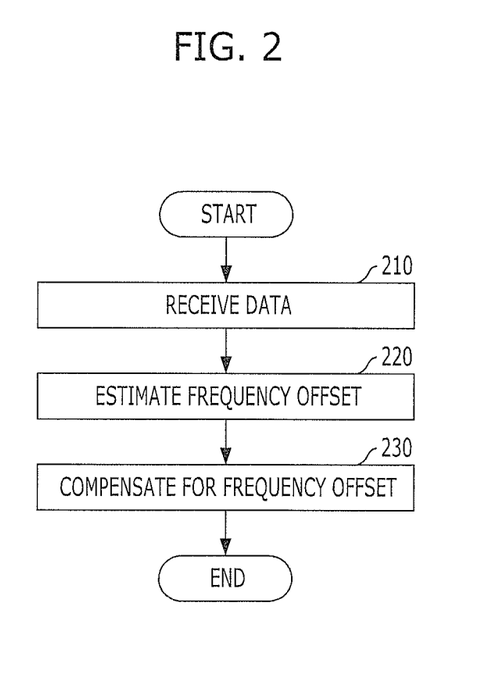
FIG. 2 is a diagram schematically illustrating an operation process of the apparatus for receiving data in the communication system in accordance with the embodiment of the present invention.

FIG. 2 is a diagram schematically illustrating an operation process of the apparatus for receiving data in the communication system in accordance with the embodiment of the present invention.

Referring to FIG. 2, in S210, the apparatus for receiving data receives the large-capacity data transmitted through the wireless frequency channel from the apparatus for transmitting data as described above.

Further, in S220, the apparatus for receiving data estimates the frequency offset for the wireless frequency channel through which the data are transmitted. In this case, the apparatus for receiving data accurately estimates the frequency offset based on the interpolation scheme using the periodogram as described above.

Next, in S230, the apparatus for receiving data compensates for the estimated frequency offset and is frequency-synchronized with the wireless frequency channel through which the data are transmitted based on the frequency offset compensation, thereby normally receiving the large-capacity data transmitted through which the wireless frequency. Herein, the operation of the apparatus for receiving data in the communication system in accordance with the embodiment of the present invention to estimate the frequency offset based on the interpolation scheme using the periodogram will be described in more detail.

First, the data transmitted through the wireless frequency channel from the apparatus for transmitting data may be represented as the following Equation 1.

$$x_n = \sum_{k=0}^{N-1} c_k e^{j2\pi kn/N} \qquad \text{[Equation 1]}$$

In the above Equation 1, Xn represents the data transmitted through the wireless frequency channel, that is, the data transmitted from the apparatus for transmitting data, $C_k$ represents data transmitted through any k-th subcarrier in the wireless frequency channel, and N represents a fast Fourier transform (FFT) (hereinafter, referred to as 'FFT') size.

Further, when the apparatus for receiving data receives the data transmitted through the wireless frequency channel from the apparatus for transmitting data, the data received by the apparatus for receiving data may be represented by the following Equation 2.

$$r(n)=y(n)e^{j2\pi vn/N}+w(n) \quad \text{[Equation 2]}$$

In the above Equation 2, r(n) represents the data received by the apparatus for receiving data, y(n) represents the data transmitted from the apparatus for transmitting data, that is, data reflecting wireless frequency channel components to the data represented by Equation 1, that is, the data transmitted through the real wireless frequency channel, v represents the normalized frequency offset according to a subcarrier interval, and w(n) represents Gaussian noise having a variance of $\sigma_w^2$.

Further, the data transmitted through the real wireless frequency channel in the data, that is, y(n) in the Equation 2, that is transmitted from the apparatus for transmitting data may be represented by the following Equation 3.

$$y(n)=\sum_{m=0}^{L-1} h_m x_{n-m} \quad \text{[Equation 3]}$$

In the above Equation 3, $h_m$ represents the wireless frequency channel through which the data transmitted from the apparatus for transmitting data are transmitted.

Herein, when the apparatus for receiving data estimates the frequency offset from the data received through the wireless frequency channel, the apparatus for receiving data estimates the frequency offset using a reference signal such as a pilot signal, a preamble, and the like, that are included in the data and defines an envelop equalized processing (EEP) (hereinafter, referred to as "EEP") factor so as to offset an effect of the reference signal at the time of estimating the frequency offset for the real received data, wherein the EEP factor may be represented by the following Equation 4.

$$f_{ne}(k)=x^*_{T,k}/\|x_{T,k}\|^2, k=0,\ldots,N-1. \quad \text{[Equation 4]}$$

In the above Equation 4, $f_{ne}(k)$ represents the EEP factor and $x_{T,k}$ represent sample data of a training symbol corresponding to the reference signal in the data transmitted through the wireless frequency channel.

In order to offset the effect of the reference signal at the time of estimating the frequency offset in the apparatus for receiving data, the data received by the apparatus for receiving data, that is, the received signals corresponding to the real data in which the reference signal components are removed from the received signals may be represented by the following Equation 5.

$$r_1(k) = r_T(k) \cdot f_{ne}(k) \quad \text{[Equation 5]}$$

$$= [y_T(k) \cdot e^{j2\pi vk/N} + w(k)] \cdot f_{ne}(k)$$

$$= e^{j2\pi vk/N} \sum_{m=0}^{L-1} h_m x_{T,n-m} \cdot f_{ne}(k) + w(k) \cdot f_{ne}(k)$$

$$= h_0 \cdot x_{T,k} \cdot e^{j2\pi vk/N} \frac{x^*_{T,k}}{\|x_{T,k}\|^2} + \sum_{m=1}^{L-1} h_m \cdot$$

$$x_{T,k-m} \cdot e^{j2\pi vk/N} \cdot f_{ne}(k) + w_1(k)$$

$$= h_0 \cdot e^{j2\pi vk/N} + w_2(k)$$

In the above Equation 5, $r_1(k)$ represents the received signals of the data received by the apparatus for receiving data from which the reference signal components are removed. Further, in the above Equation 5, $w_1(k)=w(k)\cdot f_{ne}(k)$ and $$w_2(k) = \sum_{m=1}^{L-1} h_m \cdot x_{T,k-m} \cdot e^{j2\pi vk/N} \cdot f_{ne}(k) + w_1(k).$$

The apparatus for receiving data defines the EEP factor and then, estimates the frequency offset, wherein the frequency offset may be represented by the following Equation 6.

$$v=v_f+v_{I} \quad \text{[Equation 6]}$$

In the above Equation 6, v represents the frequency offset, $V_f$ represents a fraction portion of the frequency offset, and $V_I$ represents an integer portion of the frequency offset.

Further, the apparatus for receiving data detects an integer portion of the frequency offset normalized based on the periodogram by a maximum-likelihood (ML) (hereinafter, referred to as 'ML') as described above, wherein the integer portion of the normalized frequency offset may be represented by the following Equation 7.

$$\hat{v}_I = \arg\left(\max_{f_k}\{I(f_k)+I(f_{k+1})\}\right) \quad \text{[Equation 7]}$$

In the above Equation 7, $\hat{v}_I$ represents the integer portion of the normalized frequency offset, $I(f_k)$ represents the periodogram, wherein $f_k=-N/2, \ldots 0, \ldots, N/2$ and $f_k$ is in a frequency offset estimation range at the integer multiple frequency. Further, the periodogram $I(f_k)$ at the $f_k$ integer multiple frequency may be represented by the following Equation 8.

$$I(f_k) = \left|\sum_{i=0}^{N-1} r_1(i)e^{-j2f_k i/N}\right|^2 \quad \text{[Equation 8]}$$

That is, as represented by Equation 8, the periodogram $I(f_k)$ may be represented in a form similar to the FFT. In this case, the apparatus for receiving data calculates the fraction portion of the frequency offset based on the integer portion of the normalized frequency offset as represented by Equation 7 using the periodogram. In other words, the apparatus for receiving data calculates the fraction portion of the frequency offset using the periodogram.

Describing in more detail, as described above, the periodogram may be represented in the FFT form and therefore, the periodogram may be represented by the following Equation 9.

$$I_s(f_k)=\|h_0\|^2 \sin^2[\pi(f_k-v)]/\sin^2[\pi(f_k-v)N] \quad \text{[Equation 9]}$$

In the above Equation 9, $I_s(f_k)$ represents the periodogram having N points of multiple tone signals. In this case, the periodogram at $f=V_I$ and $f_1=V_I+1$ may be represented by the following Equation 10 based on a L'Hopital's theorem and a sin c function.

$$I_s(f_0)=N^2\|h_0\|^2 \sin c^2[\pi(f_0-v)]$$

$$I_s(f_1)=N^2\|h_0\|^2 \sin c^2[\pi(f_1-v)] \quad \text{[Equation 10]}$$

In the above Equation 10, $I_s(f)$ represents the periodogram at the frequency $f=V_I$ and $I_s(f_1)$ represents the periodogram at the frequency $f_1=V_I+1$.

Meanwhile, as represented by Equation 6, the fraction portion $V_f$ of the frequency offset may be represented by $V_f = V - V_I$ from the integer portion and the fraction portion of the frequency offset, such that the periodogram at the frequency $f = V_I$ and $f_1 = V_I + 1$ represented by the above Equation 10 may be represented by the following Equation 11.

$$I_s(f_0) = N^2 \|h_0\|^2 \sin c^2[\pi(v_f)]$$

$$I_s(f_1) = N^2 \|h_0\|^2 \sin c^2[\pi(1-v_f)] \qquad \text{[Equation 11]}$$

When the periodogram at the frequency $f = V_I$ and $f_1 = V_I + 1$ as represented by Equation 11 is represented by the form of $I_s(f_1)/I_s(f_0)$, this may be represented by the following Equation 12.

$$\sqrt{\frac{I_s(f_1)}{I_s(f_0)}} = \frac{|\text{sinc}(\pi(1-v_f))|}{\text{sinc}(\pi(v_f))} \qquad \text{[Equation 12]}$$
$$= \frac{v_f}{1-v_f} \cdot \frac{|\text{sinc}(\pi(1-v_f))|}{\text{sinc}(\pi(v_f))}$$
$$= \frac{v_f}{1-v_f}$$

In the above Equation 12, $v_f/(1-v_f)$ 1 and therefore, when the above Equation 12 is arranged by the fraction portion $f_f$ of the frequency offset, this may be represented by the following Equation 13.

$$\hat{v}_f = \frac{\sqrt{I(\hat{v}_I + 1)}}{\sqrt{I(\hat{v}_I)} + \sqrt{I(\hat{v}_I + 1)}} \qquad \text{[Equation 13]}$$

In the above Equation 13, $\hat{v}_f$ represents the fraction portion of the frequency offset normalized based on the periodogram as represented by Equation 7. That is, as described above, this represents the fraction portion of the normalized frequency offset calculated based on the integer portion of the normalized frequency offset detected by the ML manner based on the periodogram.

In this case, the apparatus for receiving data calculates a residual frequency offset by iterative frequency estimation, wherein the residual frequency offset may be represented by the following Equation 14.

$$\frac{\sqrt{I(\hat{v}_I + \hat{v}_f + 0.5)} - \sqrt{I(\hat{v}_I + \hat{v}_f - 0.5)}}{\sqrt{\sqrt{I(\hat{v}_I + \hat{v}_f + 0.5)} + \sqrt{I(\hat{v}_I + \hat{v}_f - 0.5)}}} = \frac{|\text{sinc}(\pi(\hat{v}_I + \hat{v}_f + 0.5 - v))| - |\text{sinc}(\pi(\hat{v}_I + \hat{v}_f + 0.5 - v))|}{|\text{sinc}(\pi(\hat{v}_I + \hat{v}_f + 0.5 - v))| + |\text{sinc}(\pi(\hat{v}_I + \hat{v}_f + 0.5 - v))|}$$
$$= \frac{|\text{sinc}(\pi(0.5 - v_{res}))| - |\text{sinc}(\pi(0.5 + v_{res}))|}{|\text{sinc}(\pi(0.5 - v_{res}))| + |\text{sinc}(\pi(0.5 + v_{res}))|}$$
$$= 2\hat{v}_{res}$$

[Equation 14]

In the above Equation 14, $\hat{v}_{res}$ represents the normalized residual frequency offset and the apparatus for receiving data estimates the normalized frequency offset $\hat{v}$ based on a sum of the integer portion $\hat{v}_I$ of the normalized frequency offset, the fraction portion $\hat{v}_f$ of the normalized frequency offset, and the normalized residual frequency offset $\hat{v}_{res}$ that are sequentially estimated as described above. That is, the normalized frequency offset $\hat{v}$ may be represented by $\hat{v} = \hat{v}_I + \hat{v}_f + \hat{v}_{res}$. In this case, the estimation range of each normalized frequency offset may be represented by the following Equation 15.

$$-\frac{N}{2} < \hat{v}_i < \frac{N}{2} \qquad \text{[Equation 15]}$$
$$0 < \hat{v}_f < 1$$

That is, as represented by Equation 15, the estimation range of the integer portion of the normalized frequency offset is up to about a half of the discrete Fourier transform (DFT) (hereinafter, referred to as 'DFT') size and the estimation range of the integer portion of the normalized frequency offset includes the estimation range of the frequency offset generated at the time of transmitting and receiving data through the wireless frequency channel in the communication system. Further, as represented by Equation 15, the estimation range of the fraction portion of the normalized frequency offset is from 0 to +1, such that the performance is determined by the accurate estimation of the integer portion of the normalized frequency offset in the accurate estimation of the normalized frequency offset.

Therefore, the apparatus for receiving data in the communication system in accordance with the embodiment of the present invention more accurately estimates the integer portion of the normalized frequency offset based on the interpolation scheme using the periodogram, thereby accurately estimating the normalized frequency offset, that is, the frequency offset generated at the time of transmitting and receiving data.

Figure 3:
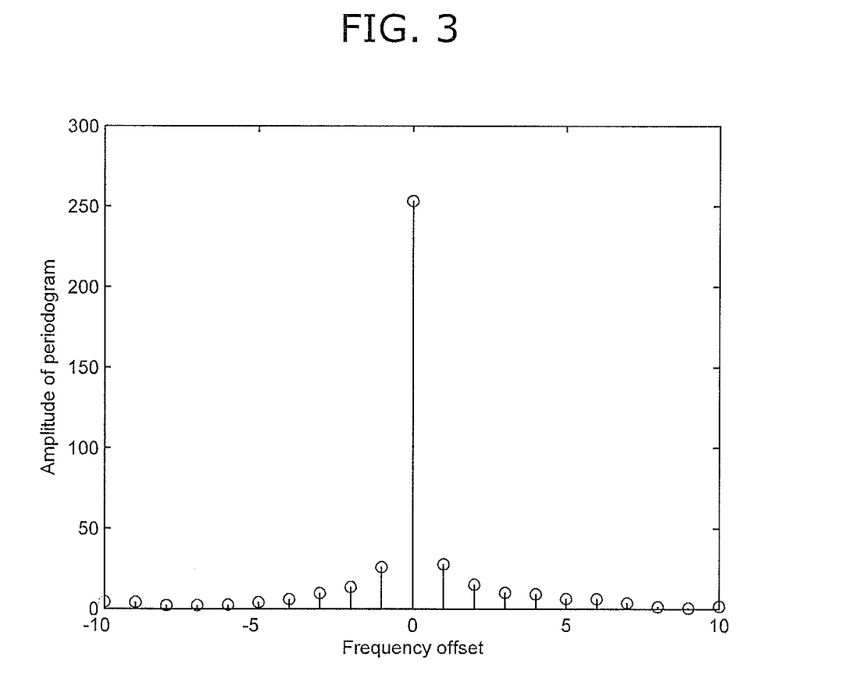
FIGS. 3 and 4 are diagrams schematically illustrating a periodogram at the time of estimating a frequency offset of the apparatus for receiving data in the communication system in accordance with the embodiment of the present invention.
Figure 4:
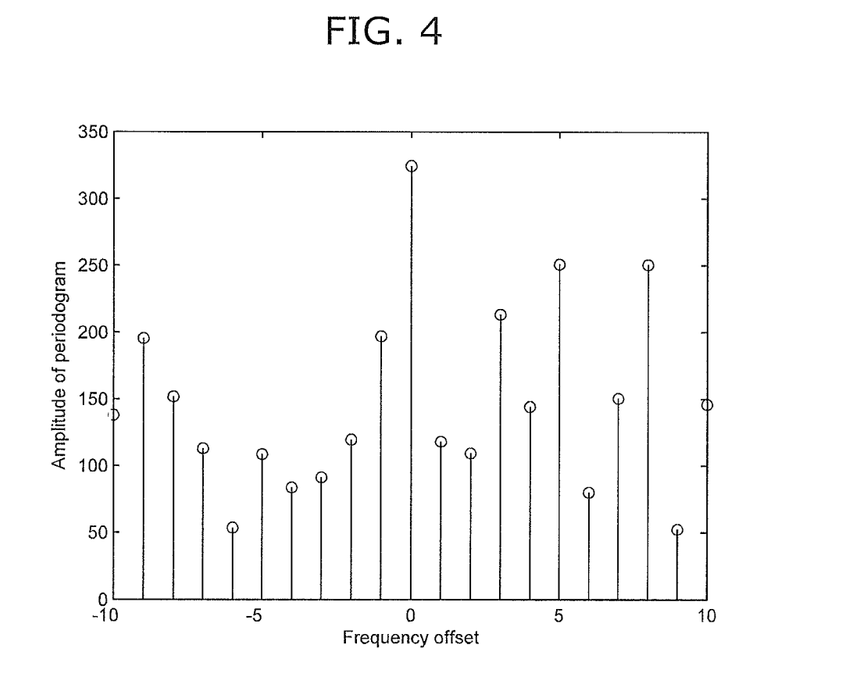

Describing in more detail, the apparatus for receiving data uses the periodogram having the largest value in the periodogram to estimate the integer portion of the normalized frequency offset, that is, the integer multiple frequency offset when estimating the integer portion of the normalized frequency offset, that is, the integer multiple frequency offset. That is, the apparatus for receiving data uses $$\max_{f_k}\{I(f_k) + I(f_{k+1})\}$$

having the largest value in the periodogram $I(f_k)$ to estimate the integer multiple frequency offset. For example, as illustrated in FIGS. 3 and 4, when the index of the frequency offset is 0 in the periodogram, the periodogram has the largest amplitude value and as illustrated in FIG. 3, the second largest amplitude value is generated at the index ±1 of the integer multiple frequency offset. Herein, FIGS. 3 and 4 are diagrams schematically illustrating the periodogram at the time of estimating the frequency offset of the apparatus for receiving data in the communication system in accordance with the embodiment of the present invention.

Meanwhile, as illustrated in FIG. 4, when the periodogram of index −1 of the integer multiple frequency offset is larger than the periodogram of index +1 of the integer multiple frequency offset, the $f_k$ integer multiple frequency index becomes −1 through $$\max_{f_k}\{I(f_k) + I(f_{k+1})\},$$

while the $f_k$ integer multiple frequency index becomes +1.

Further, in the case in which the frequency offset v is 0.1, when the $f_k$ integer multiple frequency index estimated due to noise, a multi-path of the wireless frequency channel, and the like is −1, an error portion of the integer multiple frequency offset is compensated by estimating the fraction portion of the frequency offset, that is, a fraction multiple frequency offset $\|v_f\|<1$ and the residual frequency offset $\|v_{res}\|<0.5$. Herein, mutual compensation of the fraction multiple frequency offset $v_f$ and the residual frequency offset $v_{res}$ may also exceed the error range of $\|v_f\|+\|v_{res}\|<1.5$ and therefore, the integer multiple frequency offset, that is, the integer portion $\hat{v}_I$ of the normalized frequency offset is accurately estimated in the estimation of the frequency offset.

In other words, the apparatus for receiving data in the communication system in accordance with the embodiment of the present invention estimates the integer multiple frequency offset based on the amplitude values in the periodogram as described above and calculates the amplitude value corresponding to noise that is generated at the time of transmitting and receiving data through the wireless frequency channel and a multi-path of the wireless frequency channel based on a moving mean value, so as to more accurately estimate the integer multiple frequency offset. Herein, the amplitude value in the periodogram that is minimized using the moving mean value may be represented by the following Equation 16.

$$\max_{f_k}\{(I(f_{k-1}) + I(f_k)) + (I(f_k) + I(f_{k+1}))\} \quad \text{[Equation 16]}$$

Figure 5:
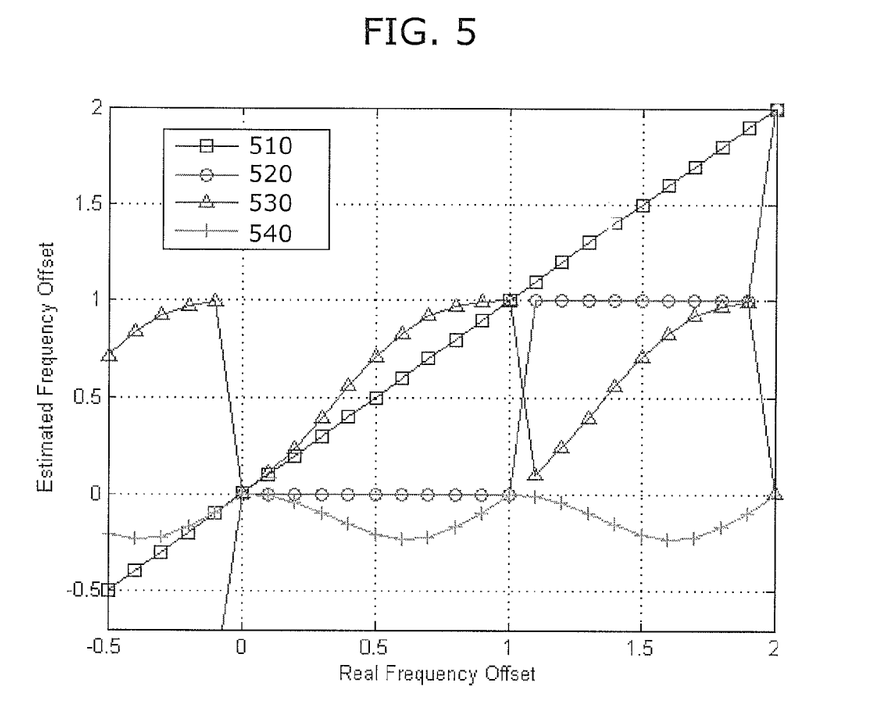
FIG. 5 is a diagram schematically illustrating a frequency offset estimated by the apparatus for receiving data in the communication system in accordance with the embodiment of the present invention.

Meanwhile, as described in Equations 1 to 15, the frequency offset estimated by the apparatus for receiving data for the real frequency offset generated at the time of transmitting and receiving data through the wireless frequency channel may be represented as illustrated in FIG. 5. Herein, FIG. 5 is a diagram schematically illustrating the frequency offset estimated by the apparatus for receiving data in the communication system in accordance with the embodiment of the present invention.

That is, the apparatus for receiving data estimates the real frequency offset generated at the time of transmitting and receiving data based on an integer portion 520 of a frequency offset, a fraction portion 530 of the frequency offset, and a residual frequency offset 540 using the periodogram described by Equations 1 to 15 and estimates the overall frequency offset 510 based on the integer portion 520 of the estimated frequency offset, the fraction portion 530 of the frequency offset, and the residual frequency offset 540. In other words, as described above, the apparatus for receiving data sequentially estimates the integer portion 520 of the frequency offset, the fraction portion 530 of the frequency offset, and the residual frequency offset 540 and estimates the overall frequency offset 510 through the estimated frequency offsets.

Figure 6:
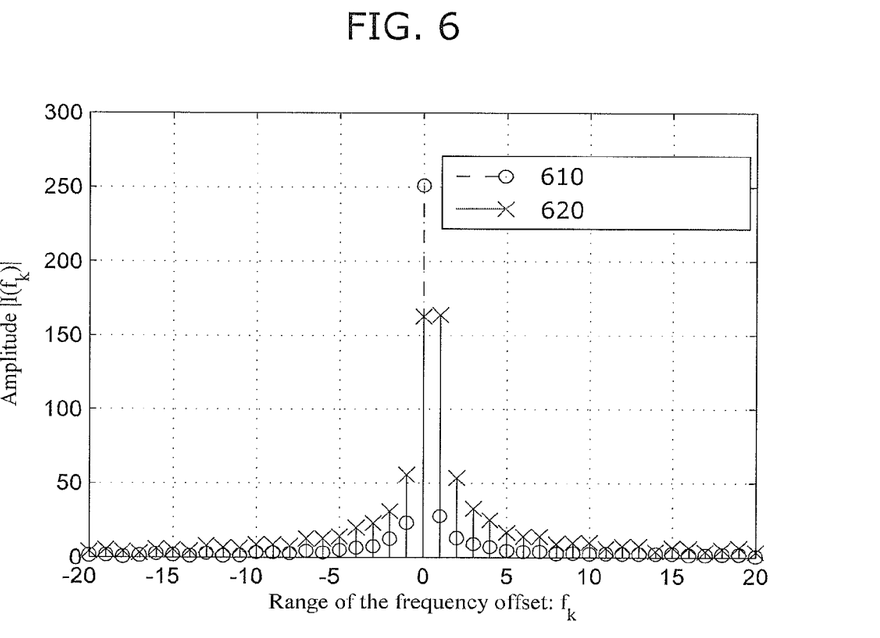
FIG. 6 is a diagram schematically illustrating amplitude of the periodogram in an integer multiple frequency index of the frequency offset $f_k$ estimated by the apparatus for receiving data in the communication system in accordance with the embodiment of the present invention.

Herein, as illustrated in FIG. 5, the periodogram according to the $f_k$ integer multiple frequency index, that is, the range of the frequency offset at the frequency offset received by the apparatus for receiving data may be illustrated in FIG. 6, in particular, as illustrated in FIG. 6, when the frequency offset is 0.1 (610) and the frequency offset is 0.5 (620), the amplitudes of each periodogram are generated and thus, the frequency offset cannot be more accurately estimated.

Therefore, as described above, thB apparatus for receiving data in the communication system in accordance with the embodiment of the present invention estimates the frequency offset based on the periodogram and the interpolation scheme, that is, more accurately estimates the frequency offset based on the interpolation scheme using the periodogram.

FIG. 6 is a diagram schematically illustrating the amplitude of the periodogram in the $f_k$ integer multiple frequency index of the frequency offset estimated by the apparatus for receiving data in the communication system in accordance with the embodiment of the present invention.

Hereinafter, the apparatus for receiving data in the communication system in accordance with the embodiment of the present invention will describe in more detail the process of estimating the frequency offset based on the interpolation scheme using the periodogram.

First, the apparatus for receiving data detects the normalized integer multiple frequency offset using the periodogram and the normalized integer multiple frequency offset may be represented by the following Equation 17.

$$\hat{v}_{I,0} = \arg\left(\max_{f_k} I(f_k)\right), \quad \text{[Equation 17]}$$

$$-N/2 < f_k < N/2.$$

Herein, as described above, after comparing the amplitude values at the index ±1 of the integer multiple frequency offset in the periodogram and then, the integer multiple frequency offset is estimated according to the compared results.

In this case, if $I(\hat{v}_{I,0}-1) > I(\hat{v}_{I,0}+1)$, that is, if the periodogram of the index −1 of the integer multiple frequency offset is larger than the periodogram of the index +1 of the integer multiple frequency offset, in the integer multiple frequency offset, $O_1 = I(\hat{v}_{I,0}-1)$ and $\hat{v}_{I,1} = \hat{v}_{I,0}-1$. If $I(\hat{v}_{I,0}-1) < I(\hat{v}_{I,0}+1)$, that is, the periodogram of the index −1 of the integer multiple frequency offset is smaller than the periodogram of the index +1 of the integer multiple frequency offset, in the integer multiple frequency offset, $O_1 = I(\hat{v}_{I,0}+1)$ and $\hat{v}_{I,1} = \hat{v}_{I,0}+1$.

The apparatus for receiving data estimates the frequency offset based on the amplitude value of the estimated integer multiple frequency offset, wherein the estimated frequency offset may be represented by the following Equation 18.

$$O_C = \frac{O_0 \cdot \hat{v}_{I,1} + O_1 \cdot \hat{v}_{I,0}}{O_0 + O_1} \quad \text{[Equation 18]}$$

In the above Equation 18, $O_C$ represents the estimated frequency offset based on the amplitude value of the integer multiple frequency offset. In this case, $O_0 = \hat{v}_{I,0}$.

Next, the apparatus for receiving data more accurately estimates the frequency offset based on the interpolation scheme and more accurately estimates the frequency offset by interpolating the frequency offset estimated based on the amplitude value of the integer multiple frequency offset as represented by Equation 18 with coefficients. Herein, the coefficients of the frequency offset estimated based on the amplitude value of the integer multiple frequency offset may be represented by the following Equation 19.

$$C_L = \sum_{n=0}^{N-1} r_1(n) \cdot e^{-j2\pi n O_L / N} \quad \text{[Equation 19]}$$

$$C_R = \sum_{n=0}^{N-1} r_1(n) \cdot e^{-j2\pi n O_R / N}$$

In the above Equation 19, $C_L$ represents a left coefficient of the frequency offset calculated by performing FFT on the estimated frequency offset $O_C$ estimated as represented by Equation 18 and $C_R$ represents a right coefficient of the frequency offset calculated by performing FFT on the estimated frequency offset $O_C$ as represented by Equation 18. Further, $O_L$ and $O_R$ are a left frequency offset and a right frequency offset for calculating the frequency coefficients of the estimated frequency offset $O_C$ as represented by Equation 18, in particular, the left coefficient $C_L$ and the right coefficient CR, wherein $O_L=O_C-A$ and $O_R=O_C+A$ and A represents a real number arbitrarily defined according to the periodogram.

The apparatus for receiving data calculates the coefficients of the frequency offset as represented by Equation 19 and then, finally estimates accurately the frequency offset by interpolating the estimated frequency offset $O_C$ estimated based on the amplitude value of the integer multiple frequency offset as represented by Equation 18 with the coefficients $C_L$ and $C_R$ of the frequency offset, wherein the finally estimated frequency offset may be represented by the following Equation 20.

$$O_{CC} = \frac{O_L \cdot C_L + O_R \cdot C_R}{C_L + C_R} \quad \text{[Equation 20]}$$

In the above Equation 20, $O_{CC}$ represents the final frequency offset estimated based on the interpolation scheme using the periodogram by the apparatus for receiving data, wherein the apparatus for receiving data compensates for the frequency offset accurately calculated as represented by Equation 20 and is frequency-synchronized with the wireless frequency channel through which the large-capacity data are transmitted, such that the large-capacity data transmitted through the wireless frequency channel by the apparatus for transmitting data are normally received.

Figure 7:
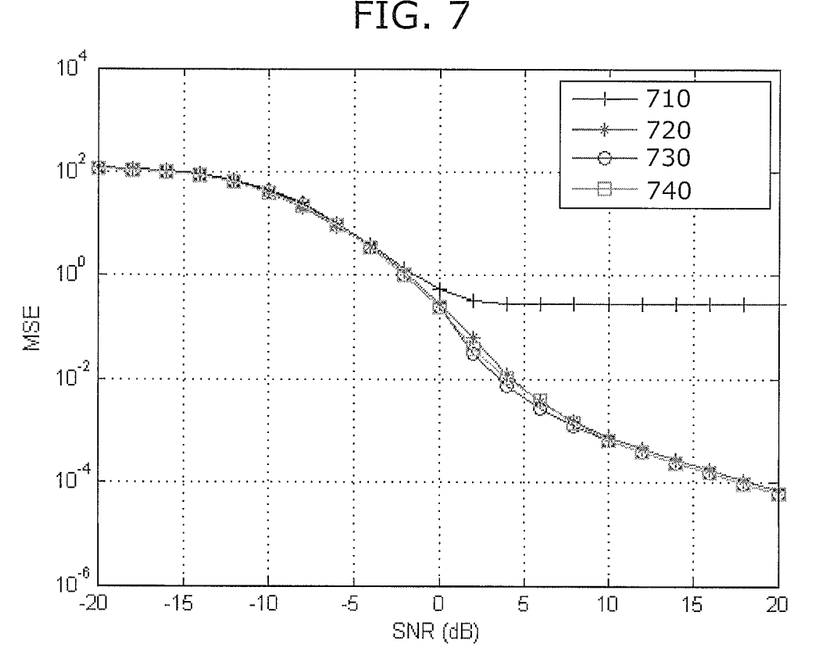
FIGS. 7, 8, and 9 are diagrams schematically illustrating results of estimating the frequency offset of the apparatus for receiving data in the communication system in accordance with the embodiment of the present invention.
Figure 8:
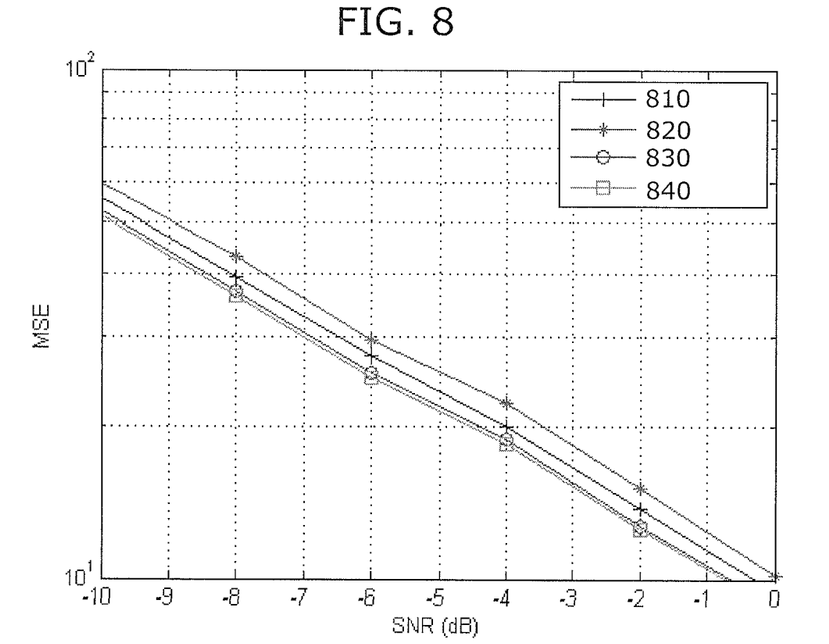
Figure 9:
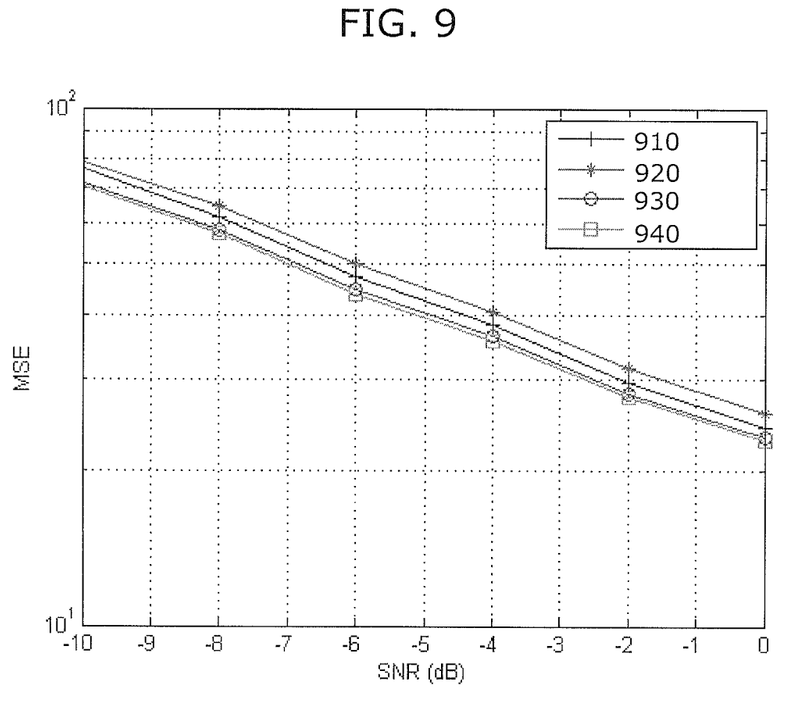

As illustrated in FIGS. 7, 8, and 9, the apparatus for receiving data estimates the frequency offset using the periodogram described in Equations 1 to 15 (720, 820, 920), estimates the frequency offset using one amplitude value of the integer multiple frequency offset in the periodogram (710, 810, 910), estimates the frequency offset with one amplitude value by comparing the amplitude values of the integer multiple frequency offset in the periodogram described in Equation 18 (740, 840, 940), or estimates the frequency offset by calculating and interpolating the coefficients of the frequency offset estimated by Equation 18 described in Equations 19 and 20 (730, 830, 930). Herein, FIGS. 7, 8, and 9 are diagrams schematically illustrating results of estimating the frequency offset of the apparatus for receiving data in the communication system in accordance with the embodiment of the present invention.

Further, as illustrated in FIGS. 7, 8, and 9, when a mean square error (MSE) (hereinafter, referred to as 'MSE') according to a signal-to-noise ratio (SNR) (hereinafter, referred to as 'SNR') of the data received through the wireless frequency channel is more increased than the frequency offset estimation with one amplitude value by comparing the cases in which another frequency offset is estimated, in particular, the amplitude values of the integer multiple frequency offset as the SNR is increased (740, 840, 940), in the case in which the frequency offset is estimated using one amplitude value (710, 810, 910). That is, the apparatus for receiving data compares the amplitude values of the integer multiple frequency offset to more accurately estimate the frequency offset based on the estimating of the frequency offset with one amplitude value (740, 840, 940).

Further, the estimating of the frequency offset with one amplitude value by comparing the amplitude values of the index of the integer multiple frequency offset (740, 840, 940) and the estimating of the frequency offset by calculating and interpolating the coefficients of the estimated frequency offset (730, 830, 930) is more accurately performed based on Equations 18, 19, and 20 as described above, such that the complexity is more remarkably reduced than the estimating of the frequency offset using the periodogram described in Equations 1 to 15 (720, 820, 920). Further, the apparatus for receiving data performs the compensation based on the frequency offset to which the estimating of the frequency offset (740, 840, 940) is subjected with one amplitude value by comparing the amplitude values of the integer multiple frequency offset or the frequency offset to which the estimating of the frequency offset (730, 830, 930) is subjected by calculating and interpolating the coefficients of the estimated frequency offset, thereby frequency-synchronizing with the multiple wireless channel and then, normally receiving the large-capacity data.

In accordance with the embodiments of the present invention, it is possible to normally receive the large-capacity data transmitted through the wireless frequency channel and improve the performance of data transmission and reception of the communication system, by accurately estimating and compensating for the frequency offset generated at the time of transmitting and receiving the large-capacity data through the wireless frequency channel in the communication system based on the interpolation scheme using the periodogram.

Meanwhile, the embodiments is described in detail in the detailed description of the present invention, but may be variously modified without departing from the scope of the present invention. Accordingly, the scope of the present invention is not construed as being limited to the described embodiments but is defined by the appended claims as well as equivalents thereto.

What is claimed is:

1. An apparatus for receiving data in a communication system, comprising:
a receiving unit configured to receive data transmitted through a wireless frequency channel;
an estimating unit configured to estimate a frequency offset in the wireless frequency channel from the received data, based on an interpolation scheme a periodogram, wherein the estimating unit estimates a real frequency offset generated at the time of transmitting and receiving data based on an integer portion of the frequency offset, a fraction portion of the frequency offset, and a residual frequency offset; and
a compensating unit configured to compensate for the frequency offset so as to receive the data by frequency-synchronizing with the wireless frequency channel.

2. The apparatus of claim 1, wherein the estimating unit detects an integer multiple frequency offset of the frequency offset using the periodogram and then, compares amplitude values of indexes of the integer multiple frequency offset in the periodogram.

3. The apparatus of claim 2, wherein the estimating unit estimates a first frequency offset using the amplitude values of the indexes of the integer multiple frequency offset having a large amplitude value in the periodogram, corresponding to the comparison.

4. The apparatus of claim 3, wherein the estimating unit calculates coefficients of the first frequency offset and interpolates the first frequency offset with the coefficients to estimate a second frequency offset.

5. The apparatus of claim 4, wherein the compensating unit compensates for the first frequency offset or the second frequency offset to frequency-synchronize with the wireless frequency channel.

6. The apparatus of claim 4, wherein the estimating unit calculates coefficients of the first frequency offset by performing fast Fourier transform (FFT) on the first frequency offset.

7. A method for receiving data in a communication system, comprising:
 receiving data transmitted through a wireless frequency channel;
 estimating a frequency offset in the wireless frequency channel from the received data, based on an interpolation scheme a periodogram, wherein estimating the frequency offset includes sequentially estimating an integer portion of the frequency offset, a fraction portion of the frequency offset, and a residual frequency offset; and
 compensating for the frequency offset so as to receive the data by frequency-synchronizing with the wireless frequency channel.

8. The method of claim 7, wherein in the estimating, an integer multiple frequency offset of the frequency offset is detected using the periodogram and then, amplitude values of indexes of the integer multiple frequency offset are compared in the periodogram.

9. The method of claim 8, wherein in the estimating, a first frequency offset is estimated using the amplitude values of the indexes of the integer multiple frequency offset having a large amplitude value in the periodogram, corresponding to the comparison.

10. The method of claim 9, wherein in the estimating, coefficients of the first frequency offset are calculated and then, the first frequency offset is interpolated with the coefficients to estimate a second frequency offset.

11. The method of claim 10, wherein in the compensating, the first frequency offset or the second frequency offset is compensated to frequency-synchronize with the wireless frequency channel.

12. The method of claim 10, wherein in the estimating, coefficients of the first frequency offset are calculated by performing fast Fourier transform (FFT) on the first frequency offset.

13. An apparatus for receiving data in a communication system, comprising:
 a receiving unit configured to receive data transmitted through a wireless frequency channel;
 an estimating unit configured to estimate a frequency offset in the wireless frequency channel from the received data, based on an interpolation scheme a periodogram, wherein the estimating unit uses the periodogram having a largest value in the periodogram to estimate an integer portion of a normalized frequency offset; and
 a compensating unit configured to compensate for the frequency offset so as to receive the data by frequency-synchronizing with the wireless frequency channel.

* * * * *